(12) United States Patent
Wang et al.

(10) Patent No.: US 10,805,101 B1
(45) Date of Patent: Oct. 13, 2020

(54) COLLABORATIVE COMMUNICATIONS ENVIRONMENT AND AUTOMATIC ACCOUNT CREATION THEREOF

(71) Applicant: RingCentral, Inc., Belmont, CA (US)

(72) Inventors: John Wang, Belmont, CA (US); Nishit Rao, Foster City, CA (US); Christopher van Rensburg, Foster City, CA (US); Naveen Sanjeeva, Saratoga, CA (US); Vlad Vendrow, Belmont, CA (US); Martin Arastafar, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 16/724,290

(22) Filed: Dec. 21, 2019

(51) Int. Cl.
*H04L 12/18* (2006.01)
*H04L 12/58* (2006.01)
*G06Q 10/10* (2012.01)
*H04L 29/06* (2006.01)

(52) U.S. Cl.
CPC ....... *H04L 12/1818* (2013.01); *G06Q 10/101* (2013.01); *H04L 12/1822* (2013.01); *H04L 51/04* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 9,021,569 B1* | 4/2015 | Kashyap V | G06F 21/35 726/7 |
| 2004/0141005 A1* | 7/2004 | Banatwala | H04L 12/1813 715/751 |
| 2007/0283278 A1* | 12/2007 | Hupfer | G06F 9/542 715/751 |
| 2015/0081814 A1* | 3/2015 | Turakhia | H04L 12/1822 709/206 |
| 2019/0098059 A1* | 3/2019 | Tuculescu | H04L 65/403 |
| 2019/0258496 A1* | 8/2019 | Vinton | G06F 9/452 |
| 2019/0268174 A1* | 8/2019 | Szeredi | H04L 12/1818 |

* cited by examiner

*Primary Examiner* — Brian Whipple

(57) ABSTRACT

A method includes receiving a signal associated with an electronic meeting invitation for users to attend the electronic meeting. The users include members of an organization and at least one nonmember of the organization. Responsive to receiving the signal, an online collaborative team is automatically created within an online chat environment. The team members of the online collaborative team include the members and the at least one nonmember. In some embodiments, an online collaborative team account is automatically created for the at least one nonmember responsive to determining that the at least one nonmember has no online collaborative team account.

21 Claims, 8 Drawing Sheets

COLLABORATIVE COMMUNICATIONS ENVIRONMENT AND AUTOMATIC ACCOUNT CREATION THEREOF

TECHNICAL FIELD

The present disclosure relates generally to the field of computer-supported collaborative communications environments between a number of participants. More specifically, and without limitation, this disclosure relates to systems and methods for automatically creating an online collaborative team in an online chat environment associated with an electronic meeting invitation.

BACKGROUND

Online conferencing products and online collaborative communications environments, e.g., team messaging products, online chat, etc., are often separate systems and lack coherent integration between the two. As such, adoption of one does not necessarily lead to adoption of the other. For example, a link to a video conferencing meeting can be sent to a user that has participated or is going to participate in an online meeting, e.g., online conferencing, however, the user may never become exposed to any messaging related to the online meeting that may have transpired before, during, or after the meeting in online collaborative communications environments such as online chat.

A slew of activities, e.g., document sharing, text messaging, email, etc., often occur before, after, and during the online meeting initiated by an online conferencing product. Unfortunately, these electronic activities often occur in isolation, e.g., via email, via text, online chat, etc., without being integrated into a single repository and are, therefore, unavailable to the invitees of the online meeting. Moreover, while online chats may allow participants and collaborators to create teams to discuss topics, projects, initiatives, etc., the team creator typically has to manually create the online collaborative team. Unfortunately, there is currently no automatic system to create the online collaborative team environment and to integrate the slew of activities therein when an electronic meeting invitation is initiated. Moreover, external users, e.g., invitees external to an organization, often do not have access to the slew of activities occurring in the online collaborative team environment. Even if the external users are provided access, for example to the online collaborative team environment, creating accounts for those external users often becomes an obstacle because of additional steps that need to be taken.

SUMMARY

The present disclosure arises from the realization that disparate collaboration and conferencing systems without any apparent integration therein result in loss of valuable data and its availability to electronic meeting participants. While online collaborative teams provide a platform to exchange electronic data associated with an electronic meeting invitation, team creation is not only manual in nature but it may also require external users, e.g., external to an organization, to create an account to access the content, which may pose a barrier to adoption of the collaborative team environment and access thereof. Accordingly, it is desirable to have a system that automatically creates a collaborative team in response to an electronic meeting invitation (e.g., creation of the invite, activation of a link within the invite, etc.). Furthermore, it is desirable to have a system that creates a new collaborative team account for users, e.g., invitees of the electronic meeting, that are external to the organization, thereby eliminating the need for external users to manually create an account or to actively intervene to provide any data associated with the account creation. It is further desirable to create accounts for external users where the external users' access is authenticated for the first time without the need to have the users provide the authenticating item prior to the external users' first time access.

A method includes receiving a signal associated with an electronic meeting invitation for users to attend the electronic meeting. The users include members of an organization and at least one nonmember of the organization. Responsive to receiving the signal, an online collaborative team is automatically created within an online chat environment. The team members of the online collaborative team include the members of the organization and the at least one nonmember of the organization. In some embodiments, an online collaborative team account is automatically created for the at least one nonmember responsive to determining that the at least one nonmember has no online collaborative team account.

In some embodiments, the method further includes processing voice recognition or facial recognition for authenticating the at least one nonmember to provide them access to the created online collaborative team account. According to some embodiments, the method further includes aggregating and maintaining electronic communications and data, prior to the electronic meeting, in the online collaborative team and online chat environment. In some non-limiting embodiments, the method includes aggregating and maintaining electronic communications and data from the electronic meeting in the online collaborative team and online chat environment. The electronic communications and data include electronic documents presented during the electronic meeting, or the electronic communications and data includes video and audio from the electronic meeting, or the electronic communications and data includes transcription of the electronic meeting.

In some embodiments, the online collaborative team account is created without the at least one nonmember participating in providing any information for creating the online collaborative team account. In some embodiments, the signal is received responsive to a user activating a link within the electronic meeting invitation. In other embodiments, the signal is received responsive to an organizer of the electronic meeting invitation sending the electronic meeting invitation to the users.

In some embodiments, the creating the online collaborative team is responsive to determining that a prior online collaborative team for the users for a different electronic meeting invitation has not been created. It is appreciated that, in some embodiments, the method may further include associating the at least one nonmember with its corresponding organization and rendering presence of online collaborative team accounts for the corresponding organization to its account holders and further to members of the organization and vice versa.

In some embodiments, a method includes automatically creating an online collaborative team within an online chat environment for user invitees of an electronic meeting invitation. The team members of the online collaborative team include the members of an organization and at least one nonmember of the organization. In some embodiments an online collaborative team account for the at least one nonmember is automatically created responsive to determining that the at least one nonmember has no online collaborative team account.

In some embodiments, the online collaborative team account is created without the at least one nonmember actively participating in providing any information for creating the online collaborative team account. It is appreciated that, in some embodiments, the method may further include aggregating and maintaining electronic communications and data, prior to the electronic meeting, in the online collaborative team and online chat environment. It is appreciated that the method may further include aggregating and maintaining electronic communications and data from the electronic meeting in the online collaborative team and online chat environment.

It is appreciated that, in some embodiments, information contained in the electronic meeting invitation is mined to gather information associated with the nonmember. The gathered information is used for creating the online collaborative team account for the nonmember. In some embodiments, social media is searched to gather additional information associated with the nonmember. The gathered information is used for creating the online collaborative team account for the nonmember.

These and other features and aspects of the concepts described herein may be better understood with reference to the following drawings, description, and appended claims.

DETAILED DESCRIPTION

Figure 1A:
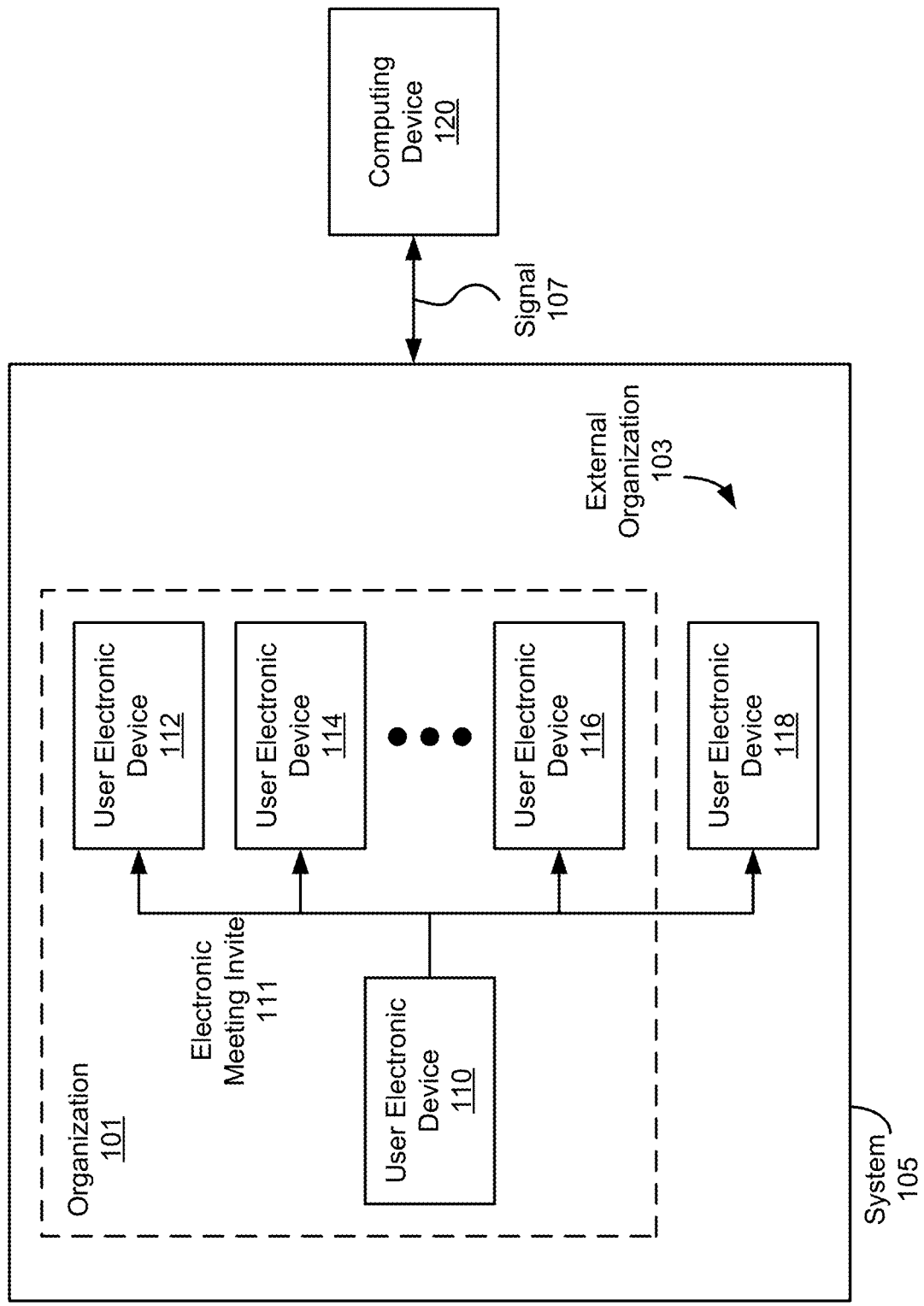
FIG. 1A depicts an example of an electronic system to automatically create a collaborative team as well as a collaborative team account for external users of an electronic meeting invitation, according to some embodiments.

The example embodiments herein are directed to systems, such as online chat systems and conferencing systems that are in communication with one another. In some embodiments, an electronic meeting invitation, e.g., calendar invite, conferencing meeting invite, video conferencing invite, etc., is created by a user, e.g., organizer, that is associated with an organization. It is appreciated that the electronic meeting invitation may list other users/invitees to participate in the electronic meeting. It is appreciated that the term "user(s)" may refer to any of the invitees to an electronic meeting, whether they participate in the electronic meeting or not, while participants may refer to users that are invitees that participate in the electronic meeting. It is appreciated that some of the invitees are individuals that are associated with and belong to the same organization as that of the organizer (hereinafter referred to as "members") while other invitees (hereinafter referred to as "nonmembers") belong to an organization different from that of the organizer (hereinafter referred to as "external organization"). In some embodiments, the electronic meeting invitation may include a link, e.g., video conferencing link, a dialing link, etc.

According to one embodiment, the online collaborative team is automatically created that is associated with the electronic meeting invitation. In some embodiments, the online collaborative team is automatically created in response to creation of the electronic meeting invitation, while in other embodiments the online collaborative team is automatically created in response to an invitee, e.g., member of the organization, nonmember of the organization, etc., of the electronic meeting performing an act, e.g., clicking on a link in the electronic meeting invitation, accepting the electronic meeting invitation, calendaring the electronic meeting invitation, etc. In some embodiments, the online collaborative team is created for invitees that have accepted the electronic meeting invitation while in other embodiments the online collaborative team is created for all invitees regardless of their response to the invitation and regardless of their actual participation.

It is appreciated that when an online collaborative team is automatically created, an account for any nonmember invitee is created. According to some embodiments, the account is created if no prior account has been established for the nonmember invitee. Moreover, it is appreciated that the account is automatically created without a need to have the nonmember invitee provide any data in order to create the account. For example, in some embodiments, public databases, e.g., publicly available search engines, social media such as Facebook® and LinkedIn® as an example, etc., are mined to gather data associated with the nonmember invitee based on limited information within the electronic meeting invitation, e.g., name, email address, organization associated with the nonmember, etc. Once the necessary data is gathered, the account for the nonmember invitee is automatically created without any active participation by the nonmember in creating the account.

It is appreciated that once the account is created, an authenticating piece of information is also gathered to authenticate the nonmember when accessing the created online collaborative team. For example, a voice recording associated with the nonmember may be obtained, e.g., either publicly via databases, through the nonmember introducing himself/herself at the beginning of the electronic meeting, etc. The obtained voice recording may be used to authenticate the nonmember when the nonmember requests access to the created online collaborative team. In some non-limiting examples, a picture of the nonmember may be obtained, e.g., either publicly through search engine or social media or through introduction of the nonmember at the online meeting (capturing the nonmember's picture) or through prior stored information in a database (e.g., checking in at the lobby of the organization where the nonmember's picture is taken), etc. The obtained picture may be used for authenticating the nonmember when the nonmember requests access to the created online collaborative team, e.g., by asking the user to allow the electronic device's camera to take a picture, etc. As such, when the nonmember requests access to the online collaborative team, the nonmember is automatically authenticated without having to enter a username, password, etc., that may have otherwise served as an obstacle in adopting and using the online collaborative team and the online chat system. Those skilled in the art would appreciate that using facial recognition and voice recognition are two examples of authenticating the nonmember for illustrative purposes and should not be construed to limit the scope of the embodiments. For example, in some other embodiments other authenticating pieces of information may be used, e.g., biometric data such as fingerprint, media access control (MAC) identification, etc. It is appreciated that in some embodiments, login and password credentials may be sent to the nonmember, e.g., via email, when the account is created.

It is appreciated that, when the online collaborative team is created, electronic communications associated with the electronic meeting may be captured and made available through the online collaborative team. For example, online chats, emails, telephone conversations, recording of the electronic meeting, transcription of the electronic meeting, etc., whether it occurs before, during, or after the electronic meeting, may be captured and integrated within the online collaborative team, thereby making it available to all invitees or participants of the electronic meeting.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts and not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying," "contacting," "gathering," "accessing," "utilizing," "resolving," "applying," "displaying," "rendering," "authenticating," "aggregating," "associating," "requesting," "monitoring," "changing," "updating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, cloud storage, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Referring now to FIG. 1A, an example of an electronic system 105 to automatically create a collaborative team as well as a collaborative team account for external users of an electronic meeting invitation, according to example embodiments, is depicted. User electronic device 110 may be associated with an organizer of an electronic meeting. The user electronic device 110 is associated with an organizer that is associated with an organization 101. For example, the organizer may be an employee of the organization 101. In some embodiments, the user electronic device 110 is used by the organizer to create an electronic meeting invitation, e.g., calendar invite, conferencing meeting invite, video conferencing invite, etc. It is appreciated that the electronic meeting invitation may list other users/invitees to participate in the electronic meeting. In this nonlimiting illustrative example, users associated with user electronic devices 112, 114, . . . , 116, and 118 are invited for the electronic meeting. In this illustrative example, user electronic devices 112, 114, . . . , 116 are associated with the same organization 101 as the organizer, hence user electronic device 110. In contrast, the invitee associated with the user electronic device 118 is associated with an external organization 103 other than organization 101. As such, users associated with user electronic devices 110, 112, 114, . . . , 116 are members of the organization 101 while the user associated with the user electronic device 118 is a nonmember. According to some embodiments, nonmembers may automatically be determined by the system, e.g., invitees with a different domain name in the email address, absence of invitee from account administration, etc. In some embodiments, the electronic meeting invite 111 message is transmitted to all invitees, e.g., invitees associated with user electronic devices 112, 114, . . . , 118. In some embodiments, the electronic meeting invite 111 may include a link, e.g., video conferencing link, a dialing link, etc.

In some embodiments, a signal 107 is created to automatically initiate the creation of the online collaborative team for the computing device 120. According to one embodiment, an online collaborative team is automatically created that is associated with the electronic meeting invitation. In some embodiments, the online collaborative team is automatically created by the computing device 120 in response to creation of the electronic meeting invitation 111 which generates the signal 107 for the computing device 120. In some embodiments, the online collaborative team is automatically created by the computing device responsive to receiving the signal 107 that is generated when an invitee, e.g., members associated with user electronic devices 112, . . . , 116, nonmember associated with the user electronic device 118, perform an act, e.g., clicking on a link in the electronic meeting invitation, accepting the electronic meeting invitation, calendaring the electronic meeting invitation, etc. In some embodiments, the online collaborative team is created for invitees that have accepted the electronic meeting invitation while in other embodiments the online collaborative team is created for all invitees regardless of their response to the invitation and regardless of their actual participation. It is appreciated that in some embodiments, the online collaborative team is created if a prior online collaborative team for the invitees of the electronic meeting has not been created. In one non-limiting example, the organizer may be given an option to create the online collaborative team by checking a box as the electronic meeting is being created or automatically after creation of the electronic meeting. According to one nonlimiting example, noninvited users that select the link or activate a portion of the electronic message invite 111 may automatically be added for the purposes of creating the online collaborative team.

It is appreciated that when an online collaborative team is automatically created, an account for any nonmember invitee is automatically created (described in greater detail in FIG. 2 below). According to some embodiments, the account is created if no prior account has been established for the nonmember invitee. Moreover, it is appreciated that the account is automatically created without a need to have the nonmember invitee provide any data in order to create the account. For example, in some embodiments, public databases, e.g., publicly available search engines, social media such as Facebook®, LinkedIn®, etc., are mined to gather data associated with the nonmember invitee based on limited information within the electronic meeting invitation, e.g., name, email address, organization associated with the nonmember, etc. Once the necessary data is gathered, the account for the nonmember invitee is automatically created without any active participation by the nonmember in creating the account.

As such, any electronic content, e.g., online chat, sharing of files, creation of tasks, emails, telephone conversations, recording of the electronic meeting, transcription of the electronic meeting, etc., related to the electronic meeting whether occurring before, during, or after the electronic meeting may be tracked and maintained within the online collaborative team. As such, any communicated data related to the electronic meeting is maintained and integrated within the online collaborative team in order to make the content available for each team member when the team member is within the online chat environment, thereby preserving data and preventing any data loss from use of disparate systems.

Figure 1B:
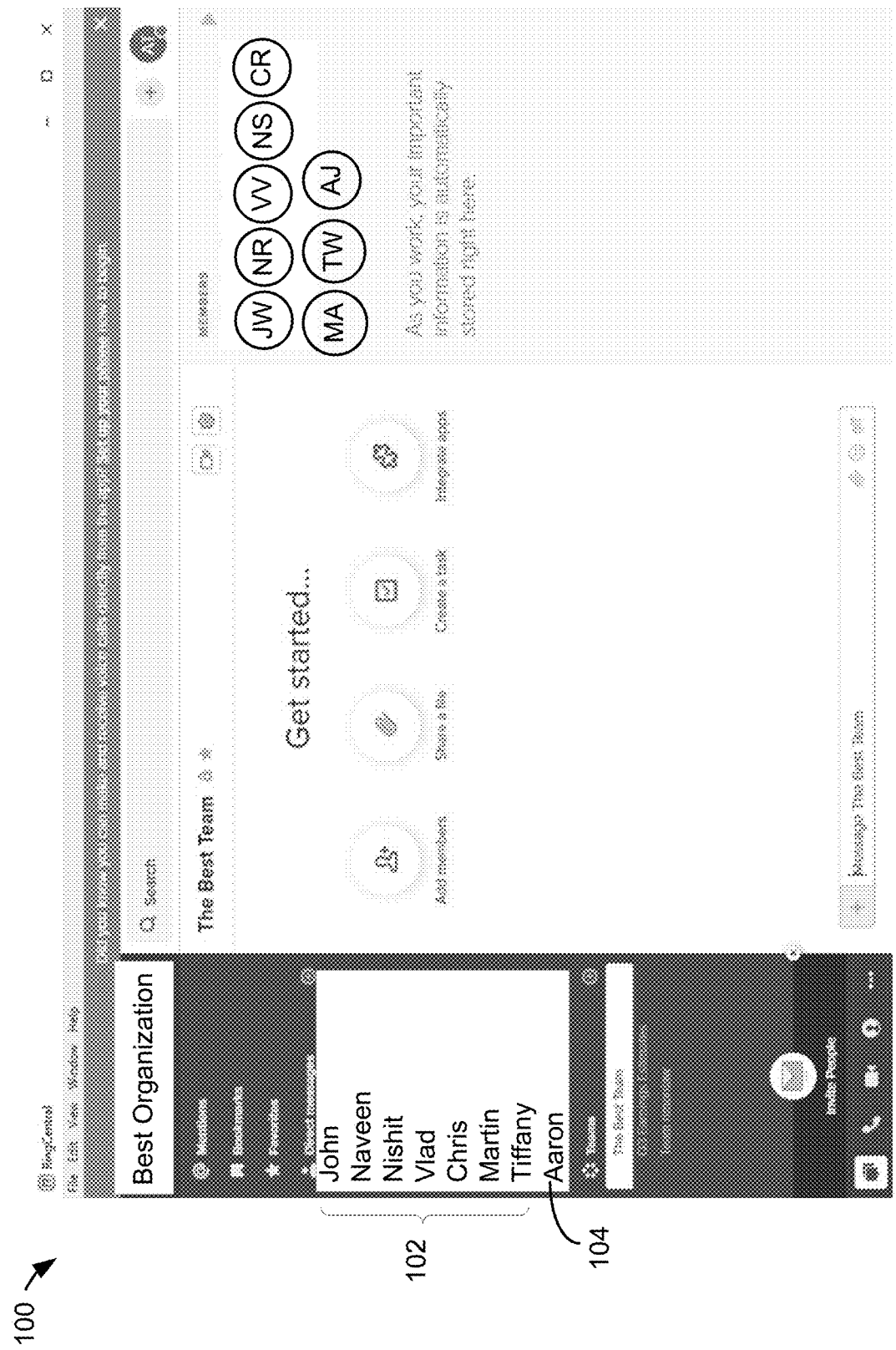
FIG. 1B depicts an example of a graphical user interface (GUI) associated with an online collaborative team created for an electronic meeting invitation, according to some embodiments.

Referring now to FIG. 1B, an example of a graphical user interface (GUI) 100 associated with an online collaborative team created for an electronic meeting invitation, according to some embodiments, is depicted. In this illustrative example, the organizer may be John that is associated with the user electronic device 110. John has created an electronic meeting invitation 111 and has invited invitees 102 Naveen, Nishit, Vlad, Chris, Martin, Tiffany, and Aaron 104 to the electronic meeting. It is appreciated that invitees 102 Naveen, Nishit, Vlad, Chris, Martin, and Tiffany may be associated with their respective electronic device and to the same organization, e.g., "Best Organization", as John while Aaron 104 may be associated with another organization, e.g., external organization 103. It is appreciated that, as described above, an online collaborative team "Best Team" is automatically created, e.g., responsive to creation of the electronic meeting invite, responsive to an action by an invitee, etc., as described above. It is appreciated that in some embodiments, the online collaborative team name may be the same as the topic of the invitation. The GUI 100 associated with the online collaborative team "The Best Team" that is automatically created is shown. It is appreciated that the online collaborative team may be used to integrate and maintain any content/data related to the electronic meeting that may transpire before, during, or after the electronic meeting.

Figure 1C:
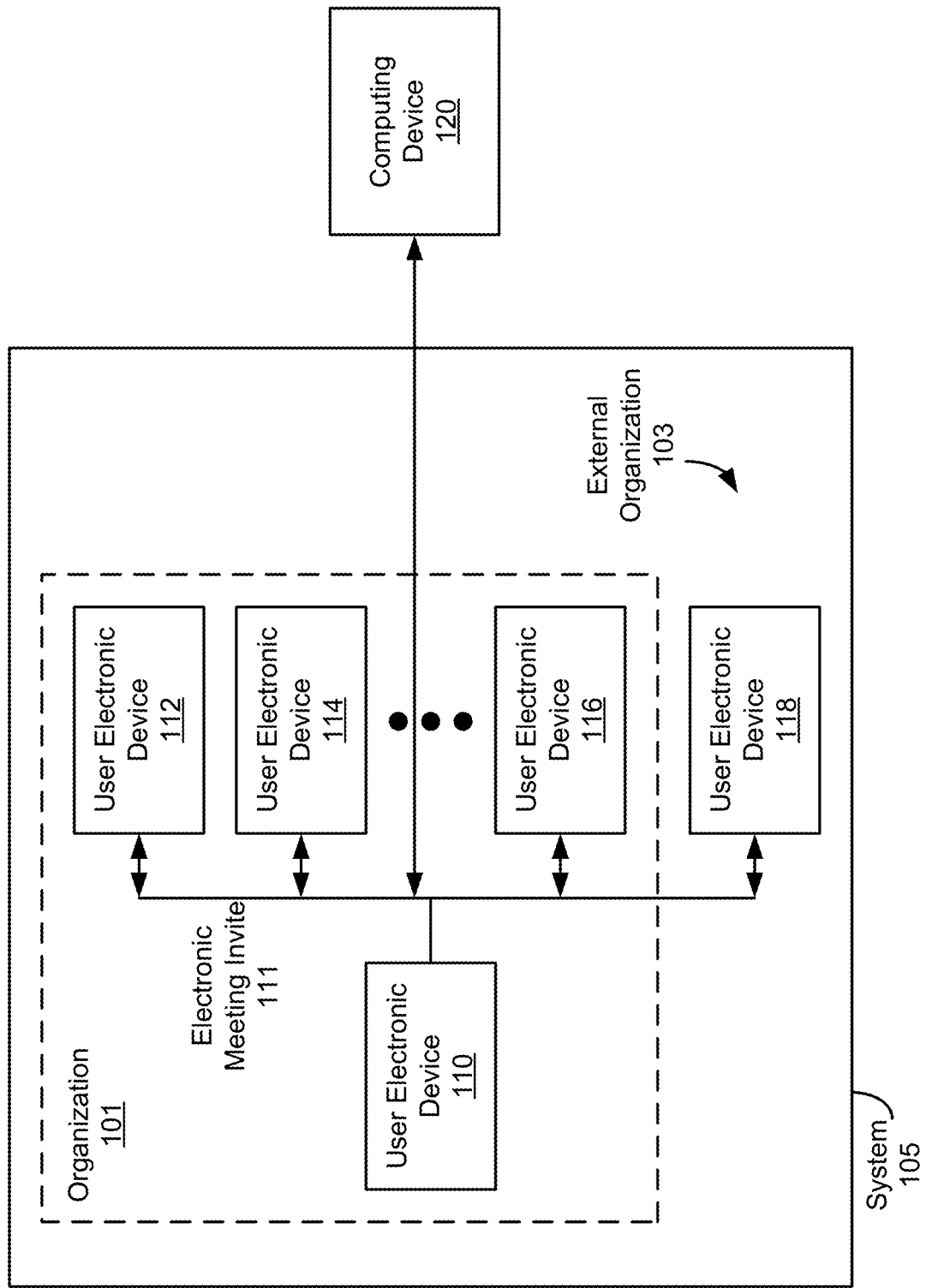
FIG. 1C depicts an example of an electronic system to automatically integrate electronic communication related to the electronic meeting invitation in a single repository, according to some embodiments.

Referring now to FIG. 1C, an example of an electronic system 105 to automatically integrate electronic communication related to the electronic meeting invitation in a single repository, according to some embodiments, is depicted. FIG. 1C is similar to FIG. 1A. However, in FIG. 1C, the computing device 120 is now in communication with the user electronic devices 110, 112, . . . , 118 in order to maintain and integrate any data/content related to the electronic meeting invitation. It is appreciated that the computing device 120 may be in communication with the electronic devices of the invitees of the electronic meeting after the online collaborative team is automatically created.

Figure 2:
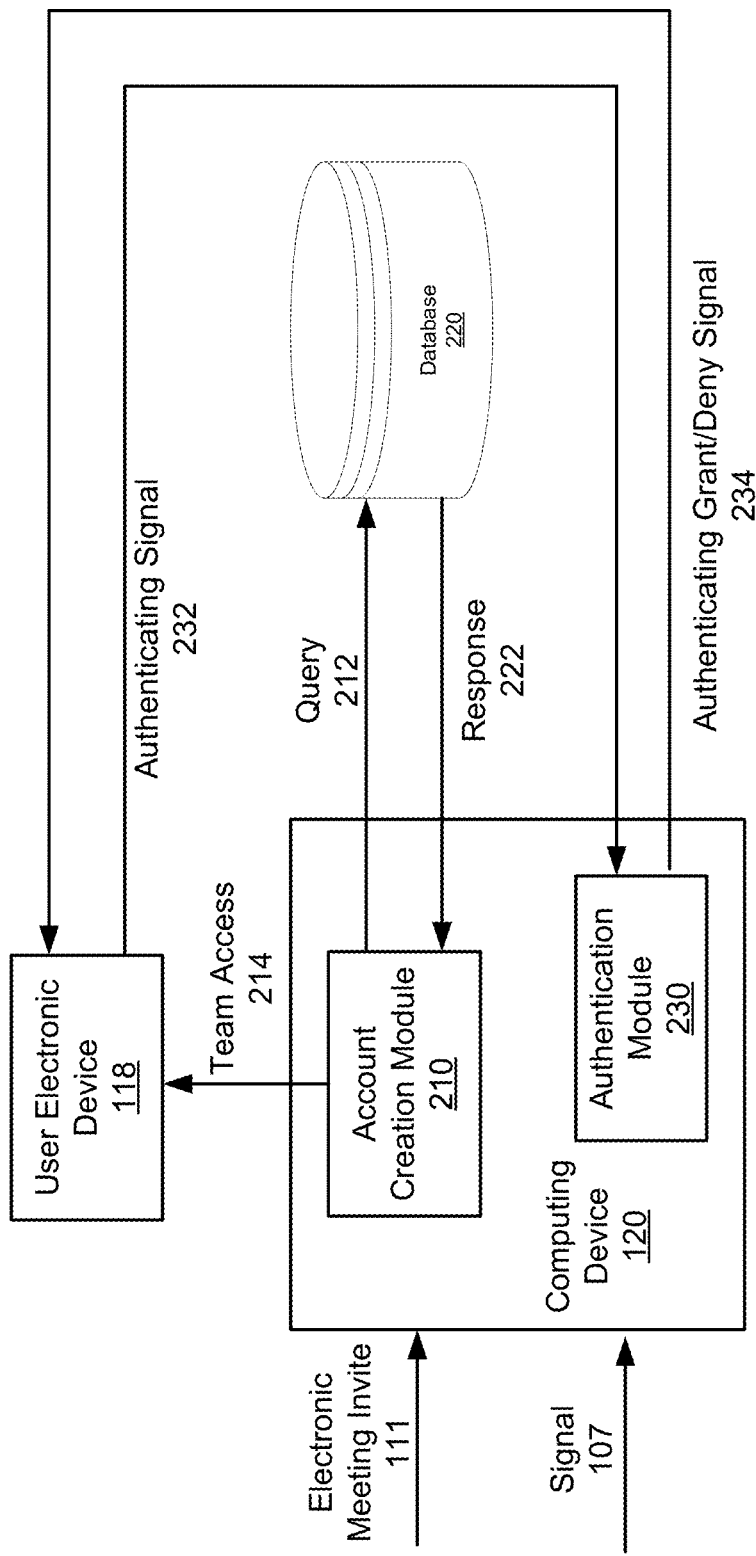
FIG. 2 depicts an example of an electronic system to automatically mine for data associated with an external user of an electronic meeting invitation and create a collaborative team account associated therewith, according to some embodiments.

Referring now to FIG. 2, an example of an electronic system to automatically mine for data associated with an external user of an electronic meeting invitation and create a collaborative team account associated therewith, according to some embodiments, is depicted. In some embodiments, the computing device 120 may include an account creation module 210 and an authentication module 230. The computing device 120 is configured to receive the electronic meeting invite 111 that was created by the user electronic device 110. The computing device 120 may further receive the instantiation signal 107 to initiate creating an online collaborative team. In some embodiments, the computing device 120 parses through the limited information contained in the electronic meeting invite 111 to gather information associated with the invitees of the electronic meeting (both members and nonmembers). As such, an online collaborative team may be created (e.g., for the member and nonmember invitees that have accepted the electronic meeting invitation, for member and nonmember invitees regardless of their acceptance of the electronic meeting invitation, etc.).

In some embodiments, the account creation module 210 parses through the limited information contained in the electronic meeting invite 111 for any of the nonmembers, e.g., user electronic device 118 associated with Aaron 104. For example, the account creation module 210 may parse through the electronic meeting invite 111 and determine the name, email address, phone number, organization, etc., of the nonmember associated with the user electronic device 118. It is appreciated that, in some embodiments, the computing device 120 may perform an internal search to obtain any additional information associated with the nonmember, e.g., any picture in the database, contact information in the database, name appearing in company directory or visitation log, name appearing on a Non-Disclosure Agreement (NDA), etc.

The parsed information can be used by the account creation module 210 to send a query 212 signal to a database 220 to gather additional information associated with the nonmember. The query 212 may contain a search query with the name of the nonmember, e.g., Aaron 104. In some embodiments, the query 212 may include additional information, such as phone number, organization that the nonmember belongs to, email address, or any information as searched by the computing device 120, etc. The database 220 may be a publicly available database or a search engine. In some embodiments, the database 220 may be associated with a social media company, e.g., Facebook®, LinkedIn®, etc. It is appreciated that a single database 220 is shown for illustrative purposes only and it should not be construed as limiting the scope of the embodiments. For example, any number of databases may be used.

It is appreciated that the database 220 responds to the query 212 with a response 222 signal. The response 222 signal may include additional information that is deemed to be related to the nonmember, e.g., Aaron 104. It is appreciated that the response 222 signal may include information that is deemed to be associated with the nonmember but may in fact not be associated with the nonmember, e.g., information associated with a different Aaron as an example. The response 222 signal, along with any additional information gathered by the computing device 120, may be used by the account creation module 210 to automatically create an account for the nonmember, e.g., user electronic device 118 associated with Aaron 104, for the online collaborative team that has been created.

According to some embodiments, the account is created for nonmember invitees if no prior account has been created for the nonmember invitees. As illustrated, the account is automatically created without a need to have the nonmember invitee, e.g., Aaron 104 associated with the user electronic device 118, provide any data in order to create the account. In other words, the nonmember does not participate in creation of the account in any active fashion partly due to use of private and/or public databases, e.g., publicly available search engines, social media such as Facebook® and LinkedIn® as an example, etc., and mining of information thereof to obtain the necessary information related to the nonmember to create the account thereof.

It is appreciated that once the account is created, an authenticating piece of information is also gathered to authenticate the nonmember when accessing the created online collaborative team. In some embodiments, the query 212 or any internal search of databases within the organization 101 may produce an authenticating piece of information that can be used to authenticate the nonmember. For example, a voice recording associated with the nonmember may be obtained, e.g., either publicly via databases, through the nonmember introducing himself/herself at the beginning of the electronic meeting, through a prior left voice message for one of the members, by recording the nonmember's voice while the nonmember checks in at the lobby of an organization 101, etc. The obtained voice recording may be used to authenticate the nonmember when the nonmember requests access to the created online collaborative team. In some non-limiting examples, a picture of the nonmember may be obtained through similar means as voice recording information. For example, a picture of the nonmember may be obtained either publicly through search engine or social media or through introduction of the nonmember at the online meeting (capturing the nonmember's picture) or through prior stored information in a database (e.g., checking in at the lobby of the organization where the nonmember's picture is taken), taking a picture of the nonmember by activating a camera on the nonmember's electronic device 118 to take a picture at the beginning of the electronic meeting, etc. It is appreciated that the obtained picture may be used for authenticating the nonmember when the nonmember requests access to the created online collaborative team, e.g., by asking the user to allow the electronic device's camera to take a picture, etc. As such, when the nonmember requests access to the online collaborative team, the nonmember is automatically authenticated without having to enter a username, password, etc., that may have otherwise served as an obstacle in adopting and using the online collaborative team and the online chat system. It is appreciated that using facial recognition and voice recognition are two examples of authenticating the nonmember for illustrative purposes and should not be construed to limit the scope of the embodiments. For example, in some other embodiments other authenticating pieces of information may be used, e.g., biometric data such as fingerprint, media access control (MAC) identification, etc.

In some embodiments, the account creation module 210 may transmit a team access 214 signal, e.g., a link, to the user electronic device 118 that is associated with the nonmember. Once the nonmember, e.g., Aaron 104, activates the transmitted information, e.g., clicking on the link, the electronic device 118 may transmit an authenticating signal 232 to the authenticating module 230 of the computing device 120. It is appreciated that the nonmember activating the information, e.g., clicking on the link, may cause the user electronic device 118 to prompt the nonmember to provide the authenticating information, e.g., prompt the nonmember to say a sentence, prompt the nonmember to capture a picture or acquiesce to a picture being automatically taken, to place a finger on a pad such that fingerprint can be taken, etc. It is appreciated that the authenticating information may automatically be taken or the nonmember may be prompted for it. It is appreciated that the authenticating information may be any piece of information except for a username and/or password. The authenticating information may generate the authenticating signal 232 that is transmitted to the authentication module 230. The received authenticating signal 232 may be compared with a previously collected information, e.g., voice and/or picture and/or any other biometric data that was collected from searching within the organization 101 or from searching public databases as discussed above, in order to determine whether the user associated with the user electronic device 118 is in fact the nonmember that was invited to the electronic meeting. For example, a voice recognition or a facial recognition may be performed to authenticate the user. Authenticating grant/deny signal 234 is transmitted to the user electronic device 118 responsive to the comparison. The authenticating grant/deny signal 234 grants the nonmember access to the online collaborative team responsive to successful authentication and may deny access to the online collaborative team if authentication fails.

Figure 3:
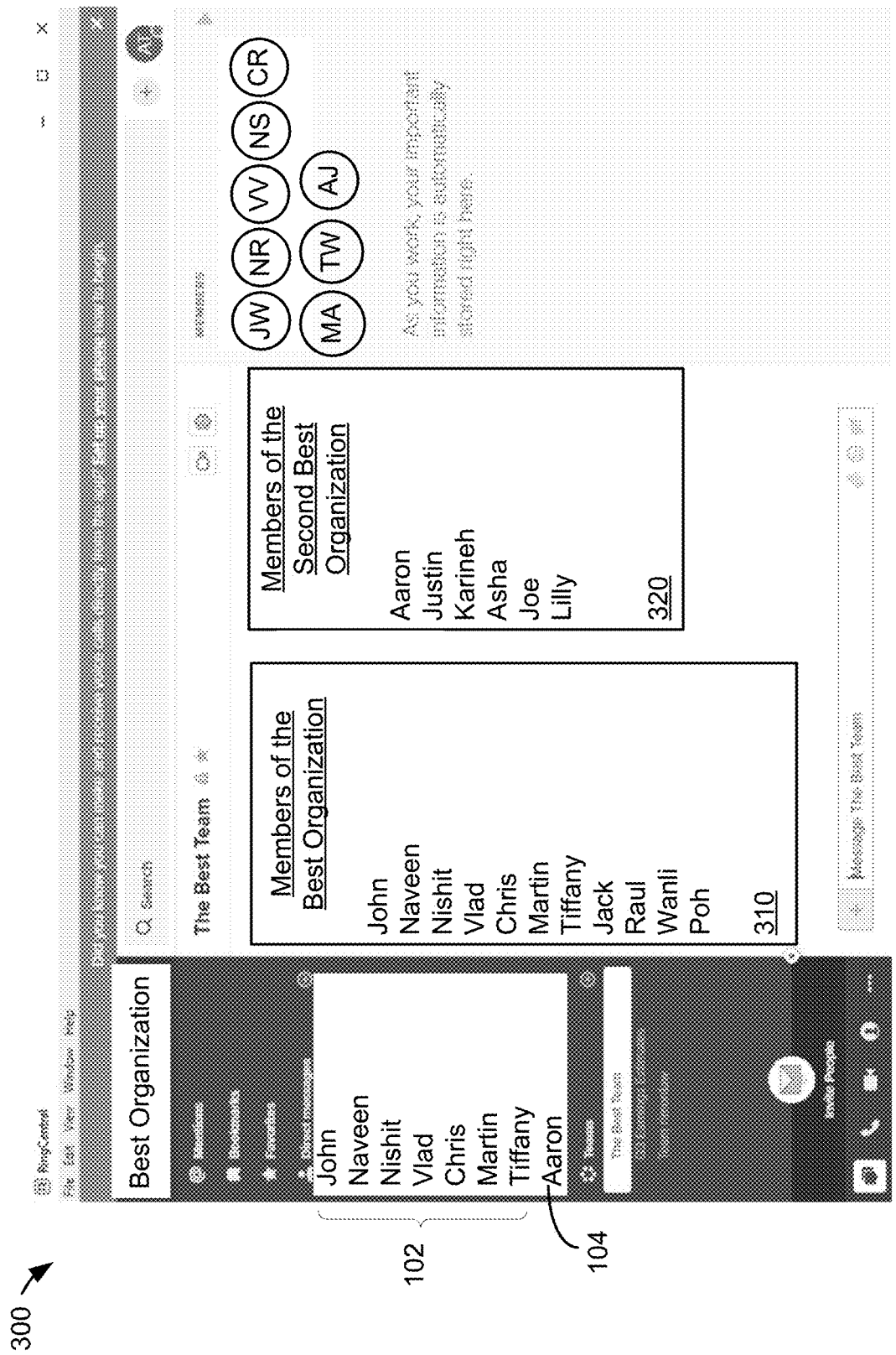
FIG. 3 depicts an example of a GUI associated with an online collaborative team created for an electronic meeting invitation and rendition of members' names between two different organizations, according to some embodiments.

Referring now to FIG. 3, an example of a GUI 300 associated with an online collaborative team created for an electronic meeting invitation and rendition of members names between two different organizations, according to some embodiments, is depicted. GUI 300 is similar to GUI 100 except that members 310 of organization 101 (including member invitees of the electronic message 111 as well as members of the organization 101 that were not invitees of the electronic message 111) become visible to nonmembers 320 within a different organization, e.g., "Second Best Organization", (including nonmembers within the same organization that were not invitees of the electronic message 111). In this illustrative example, members 310 of the "Best Organization", John, Naveen, Nishit, Vlad, Chris, Martin, Tiffany, Jack, Raul, Wanli, and Poh become visible and are rendered to members 320, Aaron, Justin, Karineh, Asha, Joe, Lilly of the "Second Best Organization" with an online collaborative team account and vice versa, even if they are not part of the "Best Team," which was previously created. It is appreciated that members 320 of the "Second Best Organization" with an online collaborative team account also become visible to one another and are rendered accordingly whereas before they may have been hidden. It is appreciated that members of only two organizations are shown for illustrative purposes but members of any number of organizations may be rendered. For example, in some embodiments, members of the "Third Best Organization" with an online collaborative account may be rendered to the members of the "Best Organization" and vice versa.

Figure 4:
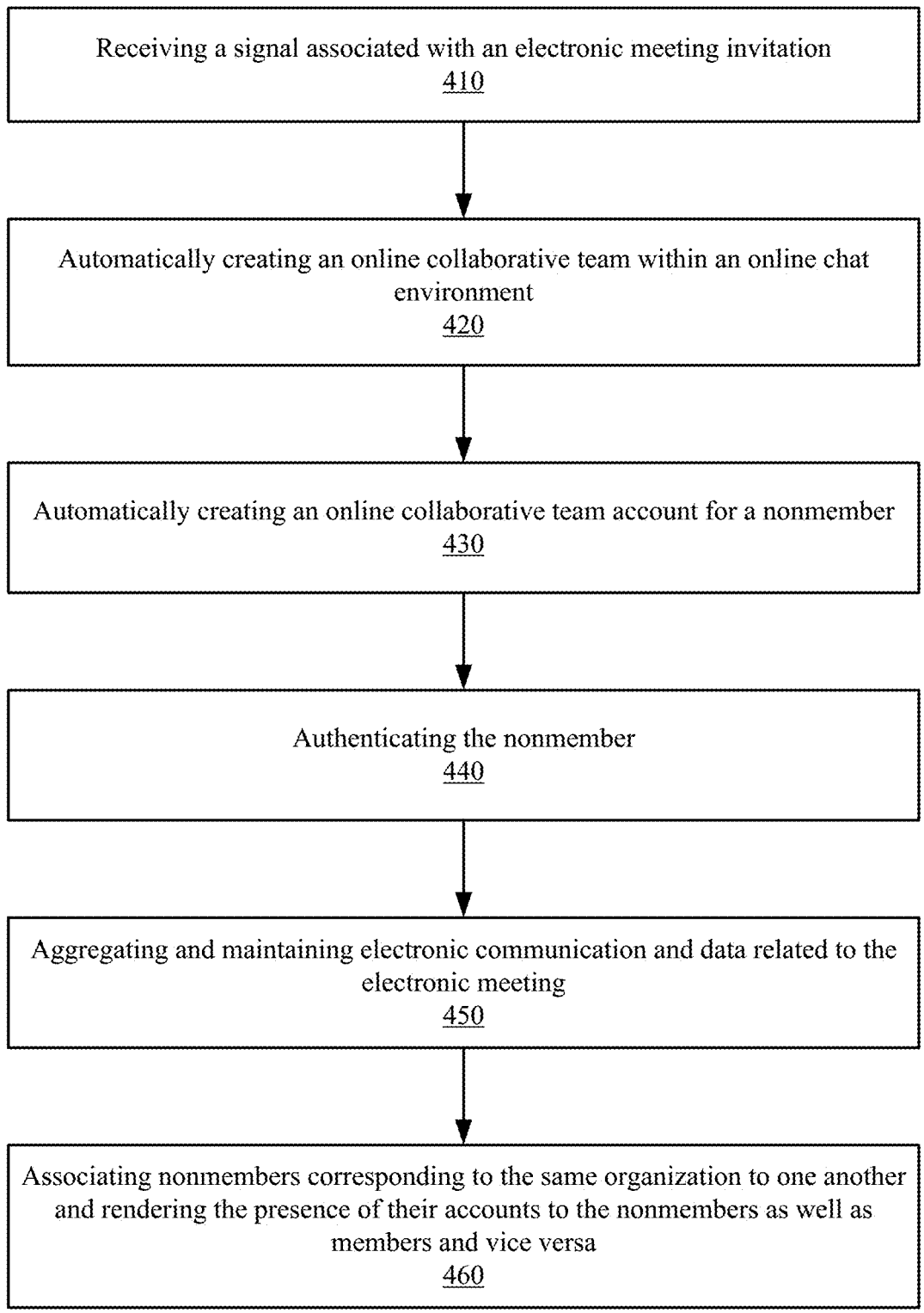
FIG. 4 is a flow chart illustrating an example method flow for creating an online collaborative team and account associated with an external user to an electronic meeting invitation, in accordance with some embodiments.

Referring now to FIG. 4, a flow chart 400 illustrating an example method flow for creating an online collaborative team and account associated with an external user to an electronic meeting invitation, in accordance with some embodiments is shown. At step 410, a signal is received associated with an electronic meeting invitation for users to attend the electronic meeting, as presented above. The users include members of an organization, e.g., organization 101, and at least one nonmember, e.g., Aaron 104, of the organization, e.g., 103. At step 420, responsive to receiving the signal, an online collaborative team within an online chat environment is automatically created. It is appreciated that team members of the online collaborative team include the members and the at least one nonmember. In some embodiments the signal is received responsive to a user activating a link within the electronic meeting invitation or responsive to an organizer of the electronic meeting invitation sending the electronic meeting invitation to the users. It is appreciated that in some embodiments, creating the online collaborative team is responsive to determining that a prior online collaborative team for the users for a different electronic meeting invitation has not been created.

At step 430, an online collaborative team account is automatically created for the at least one nonmember responsive to determining that the at least one nonmember has no online collaborative team account. It is appreciated that the online collaborative team account is created without the nonmember participating in providing any information for creating the online collaborative team account, as described above.

At step 440, a nonmember may be authenticated, e.g., voice recognition, facial recognition, biometric recognition, etc., to provide access to the created online collaborative team account.

At step 450, electronic communication and data related to the electronic meeting is aggregated and maintained, before, during, and after the electronic meeting, in the online collaborative team and online chat environment. It is appreciated that the electronic communications and data include electronic documents presented during the electronic meeting, or the electronic communications and data includes video and audio from the electronic meeting, or the electronic communications and data includes transcription of the electronic meeting.

At step 460, nonmembers corresponding to the same organization, e.g., "Second Best Organization", are associated with one another and the presence of their accounts is rendered to account holders within the "Second Best Organization" and further to members of the electronic meeting invite. It is appreciated that the presence of members of the electronic meeting invite that are associated with the organization, e.g., organization 101 or the "Best Organization", may similarly be rendered to the nonmembers of the "Second Best Organization."

Figure 5:
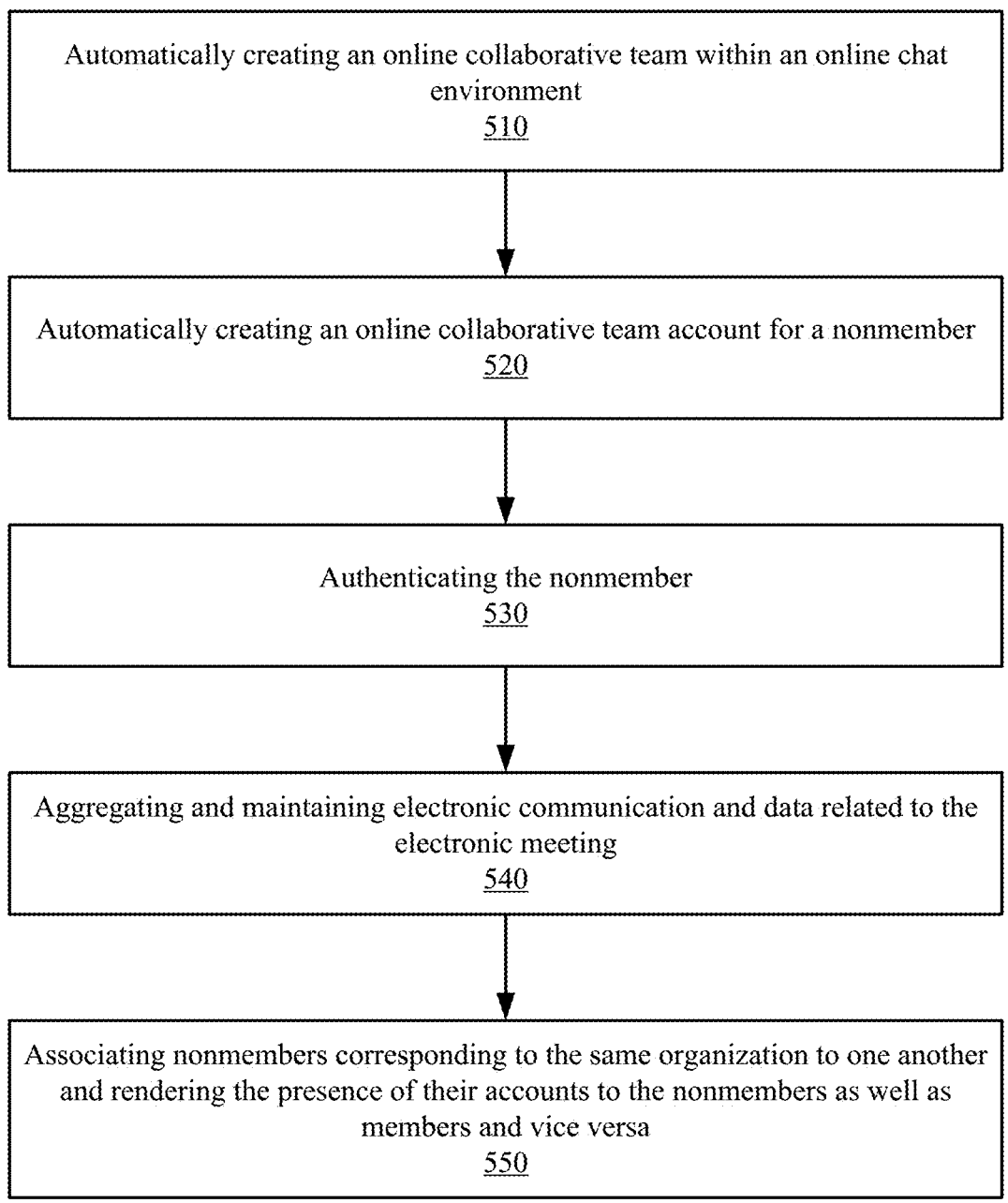
FIG. 5 is another flow chart illustrating another example method flow for creating an online collaborative team and account associated with an external user to an electronic meeting invitation, in accordance with some embodiments.

Referring now to FIG. 5, another flow chart 500 illustrating another example method flow for creating an online collaborative team and account associated with an external user to an electronic meeting invitation, in accordance with some embodiments, is shown. At step 510, an online collaborative team within an online chat environment is automatically created for user invitees of an electronic meeting invitation. It is appreciated that team members of the online collaborative team include the members of an organization and at least one nonmember of the organization. At step 520, an online collaborative team account is automatically created for the at least one nonmember responsive to determining that the at least one nonmember has no online collaborative team account. It is appreciated that the online collaborative team account is created without the active participation of the nonmember in providing any information for creating the online collaborative team account. It is appreciated that information contained in the electronic meeting invitation is mined to gather information associated with the nonmember. The gathered information is used for creating the online collaborative team account. In some embodiments, social media is searched to gather additional information associated with the nonmember. The gathered information is used for creating the online collaborative team account.

At step 530, the nonmember is authenticated by processing voice recognition or facial recognition. If the authentication is successful, the nonmember is provided access to the online collaborative team. At step 540, electronic communications and data are aggregated and maintained in the online collaborative team and online chat environment, prior to the electronic meeting, during the electronic meeting, or after the electronic meeting.

At step 550, nonmembers corresponding to the same organization, e.g., "Second Best Organization", are associated with one another and the presence of their accounts is rendered to account holders within the "Second Best Organization" and further to members of the electronic meeting invite. It is appreciated that the presence of members of the electronic meeting invite that are associated with the organization, e.g., organization 101 or the "Best Organization", may similarly be rendered to the nonmembers of the "Second Best Organization."

Figure 6:
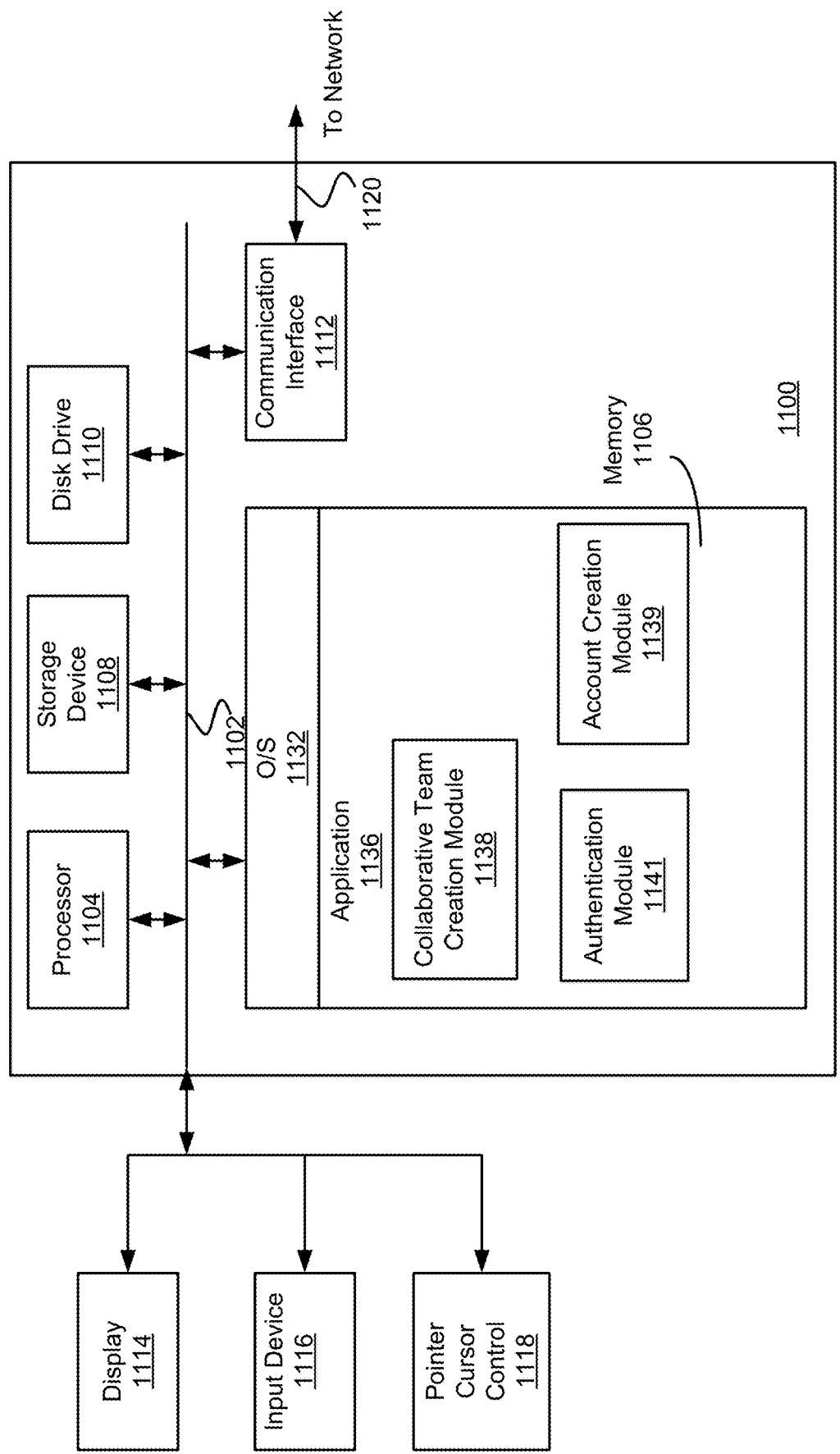
FIG. 6 is a block diagram depicting an example of computer system suitable for creating an online collaborative team and account associated with an external user to an electronic meeting invitation in accordance with some embodiments.

Referring now to FIG. 6, a block diagram depicting an example of computer system suitable for automatically creating an online collaborative team associated with an electronic meeting invite and any accounts associated with nonmembers in accordance with some embodiments is shown. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as storage device 1108 or disk drive 1110. In some examples, hard-wired circuitry can be used in place of or in combination with software instructions for implementation. In the example shown, system memory 1106 includes modules of executable instructions for implementing an operation system ("O/S") 1132, an application 1136 (e.g., a host, server, web services-based, distributed (i.e., enterprise) application programming interface ("API"), program, procedure or others). Further, application 1136 includes an online collaborative team creation module 1138 that automatically creates an online collaborative team for an electronic meeting invitation, as described above in FIGS. 1A-5. The application 1136 further includes an account creation module 1139 to automatically create an account for a nonmember in the created online collaborative team. The application 1136 further includes an authentication module 1141 that authenticates and determines whether the nonmember seeking access to the online collaborative team is the nonmember that the account was created for. It is appreciated that the operation of the collaborative team creation module 1138, authentication module 1139, and the authentication module 1141 are described in detail with respect to FIGS. 1A-5.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can implemented in a distributed architecture including multiple systems 1100.

In other examples, the systems, as described above, can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C #, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method, comprising:
    receiving a signal associated with an electronic meeting invitation for users to attend the electronic meeting, wherein the users include members of an organization and at least one nonmember of the organization;
    responsive to receiving the signal, automatically creating an online collaborative team within an online chat environment, wherein team members of the online collaborative team include the members and the at least one nonmember; and
    automatically creating an online collaborative team account for the at least one nonmember in response to determining that a prior online collaborative team for the users for a different electronic meeting invitation has not been created.

2. The method as described in claim 1 further comprising processing voice recognition or facial recognition for authenticating the at least one nonmember to provide access to the created online collaborative team account.

3. The method as described in claim 1 further comprising aggregating and maintaining electronic communications and data, prior to the electronic meeting, into the online collaborative team and online chat environment.

4. The method as described in claim 1 further comprising aggregating and maintaining electronic communications and data from the electronic meeting in the online collaborative team and online chat environment.

5. The method as described in claim 4, wherein the electronic communications and data include electronic documents presented during the electronic meeting, or the electronic communications and data includes video and audio from the electronic meeting, or the electronic communications and data includes transcription of the electronic meeting.

6. The method as described in claim 1, wherein the online collaborative team account is created without the at least one nonmember participating in providing any information for creating the online collaborative team account.

7. The method as described in claim 1, wherein the signal is received responsive to a user activating a link within the electronic meeting invitation.

8. The method as described in claim 1, wherein the signal is received responsive to an organizer of the electronic meeting invitation sending the electronic meeting invitation to the users.

9. The method as described in claim 1 further comprising:
    associating the at least one nonmember with its corresponding organization; and
    rendering presence of online collaborative team accounts for the corresponding organization to its account holders and further to members of the organization and vice versa.

10. The method as described in claim 1, wherein the online collaborative team account is created responsive to determining that the at least one nonmember has no online collaborative team account.

11. A method, comprising:
    automatically creating an online collaborative team within an online chat environment for user invitees of an electronic meeting invitation, wherein team members of the online collaborative team include members of an organization and at least one nonmember of the organization; and
    automatically creating an online collaborative team account for the at least one nonmember, wherein information contained in the electronic meeting invitation is mined to gather information associated with the nonmember, wherein the gathered information is used for creating the online collaborative team account.

12. The method as described in claim 11 further comprising processing voice recognition or facial recognition for authenticating the at least one nonmember to provide access to the created online collaborative team account.

13. The method as described in claim 11, wherein the online collaborative team account is created without the at least one nonmember actively participating in providing any information for creating the online collaborative team account.

14. The method as described in claim 11 further comprising:
    aggregating and maintaining electronic communications and data, prior to the electronic meeting, in the online collaborative team and online chat environment; and
    aggregating and maintaining electronic communications and data from the electronic meeting in the online collaborative team and online chat environment.

15. The method as described in claim 11 further comprising:
    associating the at least one nonmember with its corresponding organization; and
    rendering presence of online collaborative team accounts for the corresponding organization to its account holders and further to members of the organization and vice versa.

16. The method as described in claim 11, wherein social media is searched to gather additional information associated with the nonmember, wherein the gathered information is used for creating the online collaborative team account.

17. A non-transitory, computer-readable medium storing a set of instructions that, when executed by a processor, cause:
    automatically creating an online collaborative team within an online chat environment for user invitees of an electronic meeting invitation, wherein team members of the online collaborative team include the members of an organization and at least one nonmember of the organization; and
    automatically creating an online collaborative team account for the at least one nonmember responsive to determining that the at least one nonmember has no online collaborative team account, wherein information contained in the electronic meeting invitation is mined to gather information associated with the nonmember, wherein the gathered information is used for creating the online collaborative team account.

18. The non-transitory, computer-readable medium as described in claim 17 further comprising processing voice recognition for authenticating the at least one nonmember to provide access to the created online collaborative team account or processing facial recognition for authenticating the at least one nonmember to provide access to the created online collaborative team account.

19. The non-transitory, computer-readable medium as described in claim 17 further comprising:
   associating the at least one nonmember with its corresponding organization; and
   rendering presence of online collaborative team accounts for the corresponding organization to its account holders and further to members of the organization and vice versa.

20. The non-transitory, computer-readable medium as described in claim 17, wherein the online collaborative team account is created without the at least one nonmember actively participating in providing any information for creating the online collaborative team account.

21. The non-transitory, computer-readable medium as described in claim 17, wherein social media is searched to gather additional information associated with the nonmember, wherein the gathered information is used for creating the online collaborative team account.

* * * * *